United States Patent [19]
Andrus et al.

[11] Patent Number: 5,534,470
[45] Date of Patent: Jul. 9, 1996

[54] LITHIUM ALUMINOBORATE GLASS-CERAMICS

[75] Inventors: Ronald l. Andrus, Corning; John F. MacDowell, Penn Yan, both of N.Y.

[73] Assignee: Corning Incorporated, Corning, N.Y.

[21] Appl. No.: 329,403

[22] Filed: Oct. 27, 1994

[51] Int. Cl.⁶ ............................................ C03C 14/00
[52] U.S. Cl. .................. 501/32; 501/10; 501/65; 501/77; 501/127
[58] Field of Search .................. 501/10, 32, 65, 501/77, 127

[56] References Cited

U.S. PATENT DOCUMENTS

| | | | |
|---|---|---|---|
| 4,861,734 | 8/1989 | MacDowell | 501/10 |
| 5,112,777 | 5/1992 | MacDowell | 501/32 |
| 5,256,603 | 10/1993 | Andrus et al. | 501/32 |

*Primary Examiner*—Karl Group
*Attorney, Agent, or Firm*—Clinton S. Janes, Jr.; Angela N. Nwaneri

[57] ABSTRACT

This invention is directed to the production of thermally crystallizable glasses which, upon heat treatment in contact with alumina particulates, will form a strong glass-ceramic-bonded composite body, the excellent bonding being attributed to the presence of lithium aluminoborate crystals. The glass-ceramic composition consists essentially, in weight percent, of

| | | | |
|---|---|---|---|
| $SiO_2$ | 25–55 | MgO | 0–12 |
| $B_2O_3$ | 35–65 | $Li_2O$ + MgO | 4–16. |
| $Li_2O$ | 2–15 | | |

4 Claims, No Drawings

1

LITHIUM ALUMINOBORATE GLASS-CERAMICS

FIELD OF THE INVENTION

This invention is related to the production of glass-ceramic materials having compositions especially well suited for bonding particulate ceramic materials into dense, strong composite articles.

BACKGROUND OF THE INVENTION

The fabrication of composite articles comprising particulate ceramic materials bonded with a glass-ceramic has been practiced for a number of years. One example of that practice is illustrated in U.S. Pat. No. 4,861,734 (MacDowell), which patent described the manufacture of glass-ceramic bodies through the sintering of glass powders into an integral body, the glass powders essentially simultaneously crystallizing in situ during the sintering process. The precursor glasses disclosed therein were selected from the following three composition families, the recited ranges being expressed in terms of weight percent on the oxide basis:

(a) 20–30% CaO, 35–55% $Al_2O_3$, and 20–40% $B_2O_3$;
(b) 30–45% SrO, 30–45% $Al_2O_3$, and 20–35% $B_2O_3$;
(c) 40–55% BaO, 25–40% $Al_2O_3$, and 15–30% $B_2O_3$; and
(d) mixtures thereof.

The patent noted that, because the glass powders crystallized so rapidly during the sintering process, the disclosed glass powders were suitable for sealing operations, but their viscosity characteristics militated against their widespread utility in forming glass-ceramic-bonded ceramic composites.

A second example of the fabrication of composite articles comprising particulate ceramic materials bonded via a glass-ceramic is disclosed in U.S. Pat. No. 5,112,777 (MacDowell). That patent referred generally to glass-ceramic-bonded refractory materials, noting the applicability of such diverse materials as $Al_2O_3$, cordierite, SiC, $Si_3N_4$, TiN, and $ZrO_2$. The patent proposed the inclusion of such highly refractory particulates as $Al_2O_3$ and/or $ZrO_2$ as fillers in glass-ceramic coatings to provide barriers on various substrates to attack by hydrogen and oxygen. The patent emphasized the utility of the disclosed glass-ceramics in extending the useful life of abrasive products, with express reference to grinding wheels utilizing particulate $Al_2O_3$ as the abrasive grain. The glass-ceramic materials described in the patent were prepared from precursor glasses consisting essentially, expressed in terms of weight percent on the oxide basis, of 25–65% $B_2O_3$, and 20–75% RO, wherein RO consists of at least one divalent metal oxide selected from the group consisting of CaO, SrO, BaO, MnO, and ZnO, the sum of RO+$B_2O_3$ comprising at least 55% of the total composition, with the following optional components in the indicated maxima of up to 20% $SiO_2$, up to 15% F, up to 25% MgO, up to 10% $ZrO_2$, and up to 40% $Al_2O_3$. A further limitation was observed that, when the $Al_2O_3$, was greater than 20%, at least 2% F and/or 10% $SiO_2$ should be included for optimum results.

U.S. Pat. No. 5,256,603 (Andrus et al.) describes the formation of glass bonded, rather than glass-ceramic bonded, ceramic composite articles, with special reference being made to the use of the patented glasses to bond particulate abrasive materials into such articles as grinding wheels. Thus, the patent discusses the preparation of glass bonded ceramic composites wherein the ceramic particulates are selected from the group consisting of $Al_2O_3$, cordierite, SiC, $Si_3N_4$, $TiB_2$, TiN, zircon, and $ZrO_2$. The disclosed composites are stated to be useful also as high performance coatings and as substrates for microelectronic circuitry. The patent, however, repeatedly emphasized the strength of the bonding between the inventive glasses and alumina particles, thereby recommending their utility for bonding those particles into abrasive products such as grinding wheels. The glasses described in the patent consist essentially, expressed in terms of weight percent on the oxide basis, 15–35% CaO, 35–55% $B_2O_3$, and 10–35% $SiO_2$, the sum of CaO+$B_2O_3$+$SiO_2$ constituting at least 80% of the total composition with the molar ratio CaO:$B_2O_3$<1, and up to 20% total of optional components in the indicated proportions selected from the group consisting of

| MgO | 0–15 | $Na_2O$ | 0–20 | $ZrO_2$ | 0–10 |
|---|---|---|---|---|---|
| SrO | 0–20 | $K_2O$ | 0–20 | $WO_3$ | 0–10 |
| BaO | 0–20 | $Al_2O_3$ | 0–20 | $MoO_3$ | 0–10 |
| $Li_2O$ | 0–15 | F | 0–8 | $Nb_2O_5$ | 0–20 |

SUMMARY OF THE INVENTION

As was discussed above, U.S. Pat. No. 5,112,777 describes a field of divalent metal borate and borosilicate glass compositions that yield unusually strong glass-ceramic bonds when combined with $Al_2O_3$ and/or other ceramic phases in particulate form and fired. The crystalline phases, consisting principally of borate and/or alumina borates, can develop as a direct result of reaction/dissolution of borate or borosilicate glasses with refractory ceramic phases, most commonly $Al_2O_3$.

Our laboratory investigations have discovered a new family of thermally crystallizable lithium borosilicate glasses which can react with particulate $Al_2O_3$ in a different fashion from that described in U.S. Pat. No. 5,256,603, supra, to form an exceptionally strong glass-ceramic bond with the particulate $Al_2O_3$, as measured in flexural and compression tests performed on fired composite articles. The preferred composite articles are comprised of about 10–30% by weight lithium borosilicate glass powder and about 70–90% by weight of alumina particles. The materials are mixed together, shaped into an article of a desired configuration, and then fired at temperatures between about 750°–950°, preferably 850°–900° C., for a period of time sufficient to cause the particles to react together to form a sintered glass-ceramic-bonded ceramic composite comprising $Al_2O_3$ particulates bonded together by a glass-ceramic.

The bonding glass-ceramic comprises an interlocking, cross-bladed network of lath-like lithium aluminoborate crystals developed through interaction of the lithium borosilicate glass with the particulate $Al_2O_3$ during the sintering firing. Because of the very high strengths exhibited by these glass-ceramic bonds, they can provide a significant improvement in the performance of bonded alumina composites for applications such as abrasives, coatings, and electronic substrates. The inventive bonded composites demonstrate properties that can make them competitive in the abrasive field with the much more expensive super abrasives.

The precursor glasses to be fired into the desired glass-ceramic bonds consist essentially, expressed in terms of weight percent on the oxide basis, of about

| | | | |
|---|---|---|---|
| SiO$_2$ | 25–55 | MgO | 0–12 |
| B$_2$O$_3$ | 35–65 | Li$_2$O + MgO | 4–16 |
| Li$_2$O | 2–15 | | |

The expression "consist essentially of" is intended to allow the inclusion of minor portions of inorganic oxide components that are not detrimental to the desired properties of the inventive glass-ceramic and, most vitally, do not adversely affect the bond developed through the interaction of the lithium borosilicate glass with the particulate alumina.

GENERAL DESCRIPTION OF THE INVENTION

The above-cited composition intervals have been found to be critical in producing glasses exhibiting the demanded properties. To illustrate:

At least 25% SiO$_2$ is required to assure good glass flow and wetting of the alumina particles, and to inhibit essentially instantaneous crystallization when the precursor glass is subjected to the crystallization heat treatment. That is, the glass must flow sufficiently to wet and react with the alumina particles to form the desired bond. The presence of SiO$_2$ also enhances the chemical durability of the glass. Where the level of SiO$_2$ exceeds 55% however, the glass becomes quite refractory and flow thereof is reduced. Furthermore, high levels of SiO$_2$ can render the glass prone to phase separation.

A concentration of B$_2$O$_3$ of at least 35% is required to assure good flow of the glass. That is, B$_2$O$_3$ levels less than 35% result in glass exhibiting relatively high refractoriness with consequent less flow. On the other hand, concentrations of B$_2$O$_3$ above 65% lead to decreased chemical durability in the glass and unwanted crystallization, e.g., 9Al$_2$O$_3$.2B$_2$O$_3$ crystals may occur.

The presence of at least 2% Li$_2$O assures good glass flow and the formation of the lithium aluminoborate crystal phase, that phase believed to have the formula 2Li$_2$O.3Al$_2$O$_3$.2B$_2$O$_3$, but its adverse effect upon the overall cost of the bond is one basis for limiting its use to 15%. Furthermore, the reaction of high Li$_2$O bonds with Al$_2$O$_3$ in combination with SiO$_2$ can lead to crystal phases other than the desired aluminoborate bond.

Because of their high fluxing action and their adverse effect upon the formation of the desired lithium aluminoborate phase, the preferred inventive materials will be essentially free from the alkali metal oxides Na$_2$O and K$_2$O. By the expression "essentially free from", it is meant that the glass does not contain an amount of a component, for example, Na$_2$O and/or K$_2$O, sufficient to alter the chemical and/or physical characteristics of the precursor glass and/or the final glass-ceramic. Preferably, the component will be absent entirely, but that circumstance is not always possible because the batch materials frequently contain the component as an impurity.

MgO appears to augment the action of Li$_2$O, thereby enabling the level of Li$_2$O to be maintained at a lower value, while still forming large amounts of the desired crystalline bond phase. It is believed that MgO may form a solid solution within the 2Li$_2$O.3Al$_2$O$_3$.2B$_2$O$_3$ crystal, perhaps MgO.Li$_2$O.3Al$_2$O$_3$.2B$_2$O$_3$. MgO also seems to improve the chemical durability of the glass. Concentrations in excess of 12%, however, hazard the development of unwanted refractory crystal phases, such as spinel, in reacting with the particulate alumina.

Laboratory experimentation has indicated that the most desirable physical characteristics will typically be exhibited, both in the precursor glasses and in the crystallized glass-ceramic, in those glass compositions consisting essentially solely of Li$_2$O, B$_2$O$_3$, SiO$_2$, and, optionally, MgO. Nevertheless, minor additions, generally less than a total of 10%, of compatible inorganic metal oxides such as, for example, Al$_2$O$_3$, La$_2$O$_3$, CeO$_2$, MnO, PbO, TiO$_2$, ZnO, and ZrO$_2$, can be included to modify the properties demonstrated by the glass and those of the glass-ceramic alumina composite body. Care must be exercised in adding extraneous oxides, however, to avoid the generation of low melting glassy, i.e., uncrystallized, phases in the final product.

The method for preparing the inventive composite bodies comprises the five general steps recited below:

(a) a batch for a thermally crystallizable glass having a composition within the above ranges is melted;

(b) that melt is cooled to a glass body and that body is comminuted to a finely-divided powder;

(c) that powder is blended thoroughly with finely-divided alumina to form a homogeneous mixture of the powders;

(d) that mixture of powders is shaped into a body of a desired configuration; and (e) that body is heated to a temperature and for a time sufficient to sinter the glass particles together into an integral body while wetting the particles of alumina to a sufficient extent to react with the alumina particles to thereby develop a strong bond with the alumina powders.

As mentioned above, sintering temperatures as low as 750° C. can be operable with certain glass compositions. It is well-recognized in the art, however, that sintering, crystallization, and matrix filling reactions take place more rapidly as the temperature is raised. Furthermore, it is also well-recognized in the art that the time necessary for sintering, crystallization, etc., is dependent upon the temperature at which the reactions are carried out. Finally, it is well-recognized in the art that very high reaction temperatures can lead to thermal deformation of the body, extensive reactions that can produce undesirable phases, and even to volatilization of the glass components. Accordingly, a temperature of about 950° C. has been deemed to comprise a judicious maximum heat treating temperature. Periods of time ranging about 2–24 hours can be utilized. In general, to assure essentially complete reaction with the alumina particles, a firing period of about eight hours has been deemed to be a practical compromise.

PRIOR ART

Whereas the three United States patents discussed above, viz., U.S. Pat. No. 4,861,734, U.S. Pat. No. 5,112,777, and U.S. Pat. No. 5,256,603, are believed to constitute the most pertinent prior art, the two patents briefly reviewed below are distantly related to the subject invention.

U.S. Pat. No. 3,006,775 (Chen) discloses and claims the production of glass-ceramic articles consisting essentially, in weight percent, of

| | | | |
|---|---|---|---|
| Li$_2$O | 4–30 | Al$_2$O$_3$ | 3–25 |
| SiO$_2$ | 50–80 | Fluxing Agent | 0–15 | wherein B$_2$O$_3$ is recited as being a potential fluxing agent. The resulting glass-ceramics contain lithium aluminum silicate crystals and/or lithium silicate crystals, and the use of the materials as a bonding agent for alumina is noted. Nevertheless, it is immediately evident that the level of B$_2$O$_3$ is far below the minimum 25% mandated by the Applicants and the crystal phases are unlike those of the Applicants.

U.S. Pat. No. 5,024,974 (Nakamura et al.) discloses and claims glasses exhibiting nonlinear optical effects through the presence of ultrafine particles of CuCl and/or CuBr particles contained therein. The base glasses consist essentially, in mole percent, of

| $SiO_2$ | 10-70 | $Li_2O + Na_2O + K_2O$ | 0.1-50 |
|---|---|---|---|
| $B_2O_3$ | 30-90 | $CuCl + CuBr$ | 0.01-10 |
| $Al_2O_3$ | 0.01-40 | | |

There is no reference to particulate alumina or to the operability of the glass compositions to form bonds with those particles. There is no mention of aluminoborate crystals; the sole crystals described consisted of CuCl and/or CuBr.

DESCRIPTION OF PREFERRED EMBODIMENTS

Table I reports a number of glass forming compositions, expressed in terms of parts by weight on the oxide basis, illustrating the subject invention. Because the sum of the components totals or very closely approximates 100, for all practical purposes, the tabulated values may be considered to represent weight percent. The actual batch ingredients can comprise any materials, either the oxides or other compounds, which, when melted together, will be converted into the desired oxide in the proper proportions. For example, $Li_2CO_3$ and $MgCO_3$ can constitute the sources of $Li_2O$ and MgO, respectively.

The batch materials were compounded, thoroughly blended together to assist in obtaining a homogeneous melt, and charged into platinum crucibles. The crucibles were then introduced into a furnace operating at a temperature of about 1500° C. and maintained therewithin for about 1-2 hours.

To reduce the time and energy necessary to comminute the glass to finely-divided particles, the melts were often poured as a fine stream into a bath of tap water. This procedure, termed "drigaging" in the glass art, breaks up the stream of molten glass into small fragments which can then be milled or otherwise powdered to the desired particle size. Another technique commonly used to achieve the same goal includes running a stream of molten glass between metal rollers to form a thin ribbon of glass which was thereafter crushed and milled to the desired particle size.

It must be appreciated that the above description of mixing, melting, and forming procedures reflects laboratory activity only. The inventive glass compositions are capable of being processed utilizing mixing, melting, and forming practices conventionally used in commercial glassmaking. Thus, it is only required that the batch constituents be thoroughly blended together, melted at a sufficiently high temperature for an adequate period of time to secure a homogeneous melt, and subsequently shaped into a glass body.

The glass was reduced to powders having an average particle diameter of about 10 μm through ballmilling using $Al_2O_3$ cylinders as the milling media and methanol as the milling aid. After drying, the powders were thoroughly mixed with $Al_2O_3$ powders passing a No. 80 U.S. Standard Sieve (117 μm) in a vibratory mixer.

TABLE I

| | 1 | 2 | 3 | 4 | 5 | 6 |
|---|---|---|---|---|---|---|
| $SiO_2$ | 26.2 | 41.5 | 38.8 | 37.0 | 47.2 | 51.5 |
| $B_2O_3$ | 60.7 | 48.1 | 48.3 | 53.7 | 41.0 | 39.9 |
| $Li_2O$ | 13.1 | 10.4 | 12.9 | 9.3 | 11.8 | 8.6 |

| | 7 | 8 | 9 | 10 | 11 | 12 |
|---|---|---|---|---|---|---|
| $SiO_2$ | 46.6 | 45.5 | 51.2 | 50.8 | 34.4 | 52.3 |
| $B_2O_3$ | 43.3 | 42.3 | 39.6 | 39.3 | 53.2 | 40.4 |
| $Li_2O$ | 7.0 | 6.8 | 6.4 | 4.2 | 8.6 | 4.4 |
| MgO | 3.1 | — | 2.9 | 5.7 | 3.9 | 2.9 |
| MnO | — | 5.4 | — | — | — | — |

| | 13 | 14 | 15 | 16 | 17 | 18 |
|---|---|---|---|---|---|---|
| $SiO_2$ | 48.4 | 48.7 | 46.2 | 44.0 | 44.3 | 42.3 |
| $B_2O_3$ | 37.4 | 37.7 | 44.7 | 42.5 | 42.8 | 40.1 |
| $Li_2O$ | 6.1 | 8.1 | 3.9 | 3.7 | 5.5 | 6.5 |
| MgO | 8.1 | 5.5 | 5.2 | 9.8 | 7.4 | 2.9 |
| $Al_2O_3$ | — | — | — | — | — | 7.3 |

| | 19 | 20 | 21 | 22 | 23 | 24 |
|---|---|---|---|---|---|---|
| $SiO_2$ | 43.7 | 44.5 | 48.4 | 40.8 | 43.5 | 43.2 |
| $B_2O_3$ | 33.8 | 43.0 | 37.4 | 47.3 | 42.0 | 41.7 |
| $Li_2O$ | 5.5 | 5.6 | 4.0 | 5.1 | 7.2 | 5.4 |
| MgO | 4.9 | 5.0 | 5.4 | 6.8 | 7.3 | 9.7 |
| ZnO | — | 2.0 | — | — | — | — |
| MnO | — | — | 4.8 | — | — | — |

In order to evaluate porous samples for potential use in bonded abrasives, small (3.5 grams) composite pellets were formed by mixing glass frit [particles passing a No. 325 U.S. Standard Sieve (44 μm)], ceramic particles passing a No. 80 U.S. Standard Sieve (177 μm), and small amounts of water at concentrations calculated to yield specific grain-bond proportions. The mixtures were blended by hand, after which cylindrical pellets were dry pressed at 10,000 psi (~703 kg/cm²) and fired according to selected heat treating schedules. For strength measurements, at least three pellets were prepared and tested at each conditions and the measurements averaged.

After visual examination, the fired composite pellets were subjected to axial compression strength measurements, those values providing a measure of crushing strength. Where compositions and firing schedules yielded particularly high compression strengths, discs thereof having a diameter of 1.5" (~3.8 cm) and weighing 18 grams were prepared and fired in a manner similar to the pellets fired above. Those discs were submitted for modulus of rupture (MOR) testing utilizing a standard piston-on-three-ball technique.

Table II reports the heat treatment schedules applied to the 3.5 gram composite pellets and the 18 gram discs employing an electrically heated furnace. After the final hold temperature, the pellets were cooled at furnace rate; i.e., the electric current to the furnace was cut off and the pellets were allowed to cool to room temperature retained within the furnace.

Table II recites the dwell temperature in °C., along with a qualitative appraisal of the bond crystallinity as estimated via x-ray diffraction analysis of fine powders, a measurement of flexural strength reported as modulus of rupture (MOR), and a measurement of compressive strength, both of those measurements being expressed in terms of MPa and Ksi (thousand psi).

TABLE II

| Example | Heat Treatment | Bond Crystallinity | MOR | Compression |
|---|---|---|---|---|
| 1 | 800 | Very High | 60.72 MPa; 8.8 Ksi | 234.6 MPa; 34 Ksi |
| 2 | 900 | High | 70.38 MPa; 10.2 Ksi | 255.3 MPa; 37 Ksi |
| 3 | 850 | Very High | — | 255.3 MPa; 37 Ksi |
| 4 | 850 | High | — | 248.4 MPa; 36 Ksi |
| 5 | 900 | Medium | 71.07 MPa; 10.3 Ksi | 227.7 MPa; 33 Ksi |
| 6 | 850 | Low | 84.87 MPa; 12.3 Ksi | 255.3 MPa; 37 Ksi |
| 7 | 900 | High | 85.56 MPa; 12.4 Ksi | 255.3 MPa; 37 Ksi |
| 8 | 825 | Low | 86.25 MPa; 12.5 Ksi | 282.9 MPa; 41 Ksi |
| 9 | 900 | Medium | 85.56 MPa; 12.4 Ksi | 269.1 MPa; 39 Ksi |
| 10 | 850 | High | 80.04 MPa; 11.6 Ksi | 289.8 MPa; 42 Ksi |
| 11 | 850 | High | — | 262.2 MPa; 38 Ksi |
| 12 | 850 | Medium | 79.35 MPa; 11.5 Ksi | 276.0 MPa; 40 Ksi |
| 13 | 900 | Medium | 84.18 MPa; 12.2 Ksi | 269.1 MPa; 39 Ksi |
| 14 | 900 | High | 80.04 MPa; 11.6 Ksi | 269.1 MPa; 39 Ksi |
| 15 | 900 | Medium | 82.80 MPa; 12.0 Ksi | 269.1 MPa; 39 Ksi |
| 16 | 900 | Medium | 87.63 MPa; 12.7 Ksi | 269.1 MPa; 39 Ksi |
| 17 | 900 | Medium | 91.08 MPa; 13.2 Ksi | 262.2 MPa; 38 Ksi |
| 18 | 900 | Medium | 74.52 MPa; 10.8 Ksi | 262.2 MPa; 38 Ksi |
| 19 | 900 | Medium | 91.08 MPa; 13.2 Ksi | 310.5 MPa; 45 Ksi |
| 20 | 900 | Medium | 91.77 MPa; 13.3 Ksi | 248.4 MPa; 36 Ksi |
| 21 | 900 | Medium | 93.15 MPa; 13.5 Ksi | 269.1 MPa; 39 Ksi |
| 22 | 900 | Medium | 92.46 MPa; 13.4 Ksi | 282.9 MPa; 41 Ksi |
| 23 | 900 | Medium | 96.60 MPa; 14.0 Ksi | 269.1 MPa; 39 Ksi |
| 24 | 900 | Medium | 103.5 MPa; 15.0 Ksi | 241.5 MPa; 35 Ksi |

The very high mechanical strengths demonstrated by the sintered glass-ceramic-bonded $Al_2O_3$ particles strongly recommend the inventive thermally crystallizable glasses as bonding media for particulate $Al_2O_3$ in such applications as grinding wheels and other abrasive products where $Al_2O_3$ particles comprise the abrasive material.

Whereas the above laboratory work was drawn to forming bulk bodies, it will be appreciated that the inventive materials can be applied as coatings on high temperature refractory ceramics and metals, and as substrates for microelectronic circuitry.

Founded in an overall matrix of physical properties, the glass-ceramic-bonded $Al_2O_3$ composite comprising Example 17 sintered at 900° C. has been deemed to comprise the most preferred embodiment of the invention.

We claim:

1. A sintered glass-ceramic-bonded ceramic composite body comprising about 70–90% by weight of alumina particulates and about 10–30% by weight of glass-ceramic comprising lithium aluminoborate crystals, said glass-ceramic being crystallized in situ from a thermally crystallizable glass consisting essentially, expressed in terms of weight percent on the oxide basis, of

| | | | |
|---|---|---|---|
| $SiO_2$ | 25–55 | MgO | 0–12 |
| $B_2O_3$ | 35–65 | $Li_2O$ + MgO | 4–16. |
| $Li_2O$ | 2–15 | | |

2. A composite body according to claim 1 wherein said glass-ceramic is bonded to said alumina particulates through lithium aluminoborate crystals.

3. A composite body according to claim 1 wherein said thermally crystallizable glass further comprises up to 10% total of at least one inorganic metal oxide selected from the group consisting of $Al_2O_3$, $CeO_2$, $La_2O_3$, MnO, PbO, $TiO_2$, ZnO, and $ZrO_2$.

4. A composite body according to claim 1 wherein said thermally crystallizable glass has a composition which is essentially free from $Na_2O$ and $K_2O$.

* * * * *